United States Patent
Hung

Patent Number: 6,151,083
Date of Patent: Nov. 21, 2000

[54] MONITOR FILTER

[76] Inventor: Teng-Shun Hung, P.O. Box 82-144, Taipei, Taiwan

[21] Appl. No.: 09/059,287

[22] Filed: Apr. 14, 1998

[51] Int. Cl.⁷ ....................................................... H04N 5/72
[52] U.S. Cl. ............................ 348/818; 348/825; 348/832
[58] Field of Search ..................................... 348/818, 825, 348/832

[56] References Cited

U.S. PATENT DOCUMENTS

| | | | |
|---|---|---|---|
| 4,712,870 | 12/1987 | Robinson et al. | 359/738 |
| 4,820,224 | 4/1989 | Lemche | 445/23 |
| 5,039,266 | 8/1991 | Nagayoshi et al. | 411/433 |
| 5,048,928 | 9/1991 | Davis | 359/809 |
| 5,406,032 | 4/1995 | Clayton et al. | 174/151 |
| 5,459,527 | 10/1995 | Lin | 348/819 |
| 5,699,131 | 12/1997 | Aoki et al. | 348/832 |
| 5,803,676 | 9/1998 | Wienss | 408/1 R |
| 5,881,653 | 3/1999 | Pfiste | 108/147.13 |

Primary Examiner—Chris S. Kelley
Assistant Examiner—Ly Pham
Attorney, Agent, or Firm—A & J

[57] ABSTRACT

A monitor filter includes a rectangular frame including a first cover and a second cover engaged with the first cover, the first and second covers being of identical structure, each of the first and second covers having two upper corners formed with a semi-cylindrical recess having screw threads such that the rectangular frame will have two threaded holes at two upper corners thereof when the first and second covers are joined together, and a pair of arms each having a bottom provided with a slip-proof material and a downwardly extending screw threadedly engageable with each of the threaded holes, whereby the monitor filter can be adjusted to position right in front of a monitor.

1 Claim, 4 Drawing Sheets

MONITOR FILTER

BACKGROUND OF THE INVENTION

1. Field of the Invention

This invention is related to a monitor filter and in particular to one which can be adjusted in position.

2. Description of the Prior Art

It has been found that glare, reflection and static induction will be produced when a monitor is in use. The glare and the reflection will damage the eyesight while the static induction will hurt both the eyesight and the face skin of the operator. Hence, a number of monitor filters have been developed to reduce glare, reflection and static induction. However, the commonly used monitor filter on the market only utilizes a pair of straps provided with a hook at the free end to be suspended from the top of a monitor and the straps will become loose after a certain period of time thereby making it necessary to re-adjust the straps and therefore causing much inconvenience in use. Another commonly used monitor filter utilizes a pair of fixed arms to be suspended from the top of a monitor, but it is impossible to adjust the position of the monitor filter hence making it unfit for practical use.

Therefore, it is an object of the present invention to provide an improved monitor filter which can obviate and mitigate the above-mentioned drawback.

SUMMARY OF THE INVENTION

This invention is related to an improved monitor filter.

It is the primary object of the present invention to provide an improved monitor filter which can be adjusted in position.

It is another object of the present invention to provide an improved monitor filter which can be firmly mounted on a monitor.

It is still another object of the present invention to provide an improved monitor filter which is convenient to use.

It is still another object of the present invention to provide an improved monitor filter which is easy to assemble.

It is a further object of the present invention to provide an improved monitor filter which is simple in construction and low in cost.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
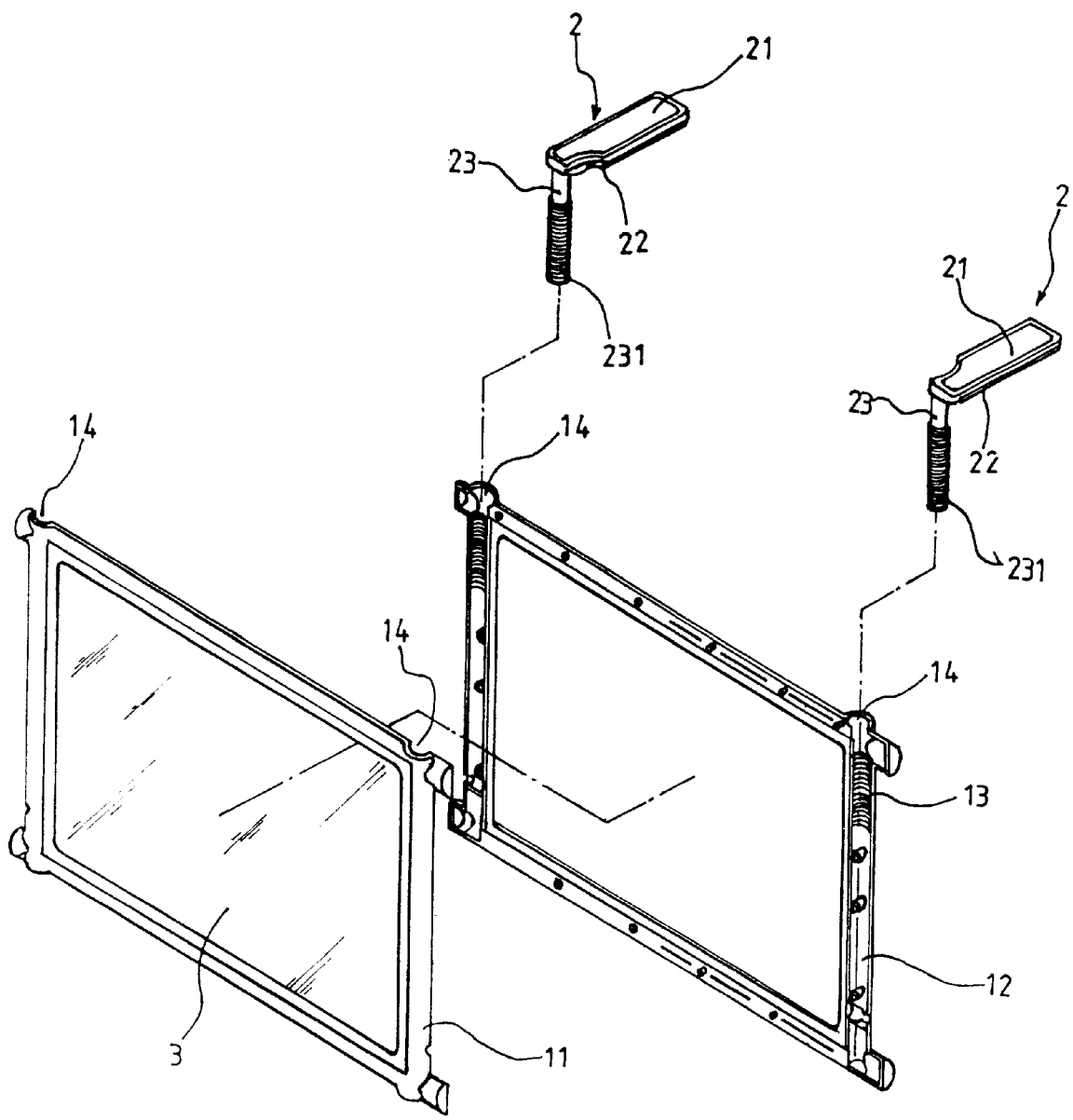
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
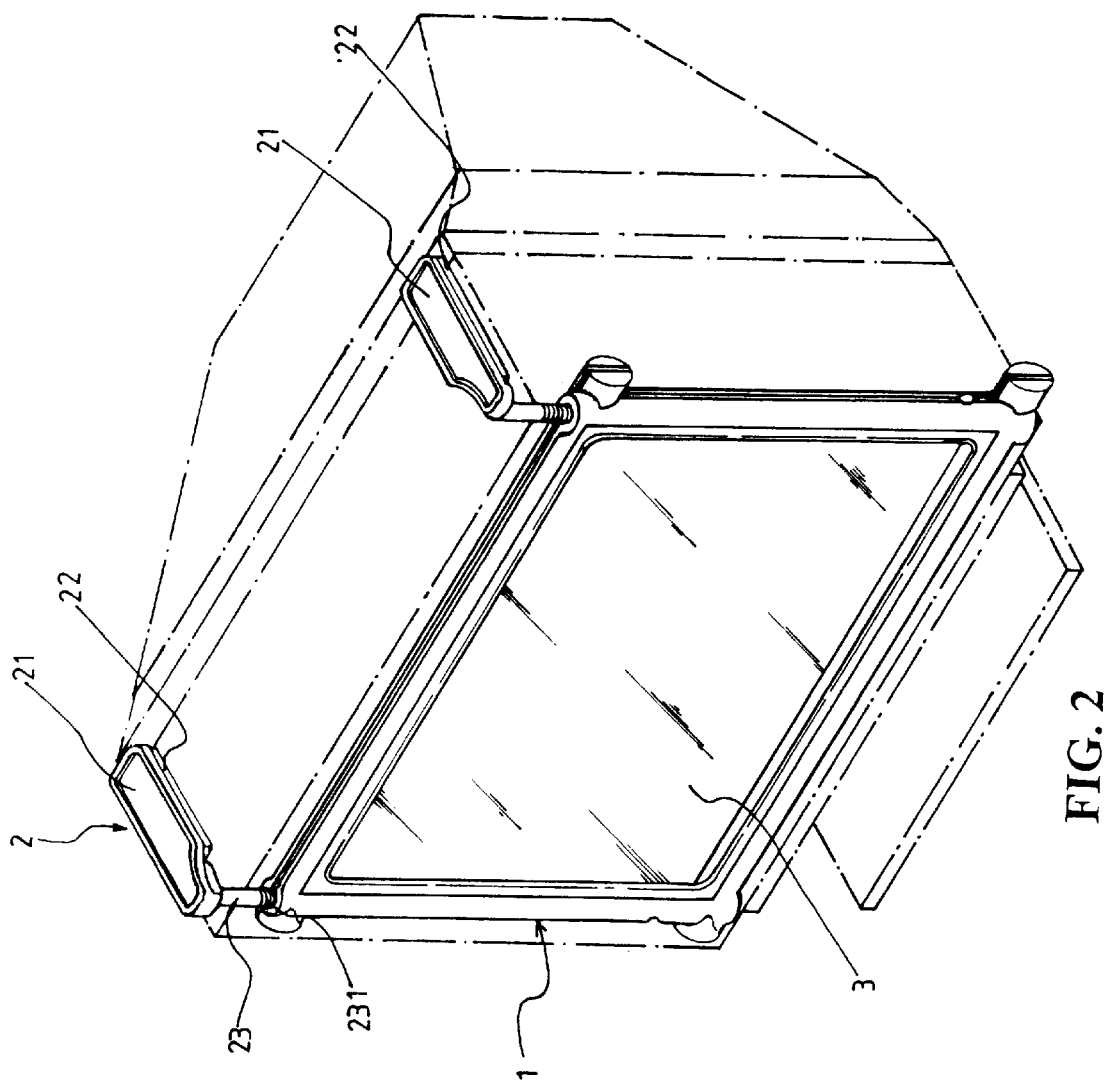
FIG. 2 is a perspective view of the present invention.
Figure 3:
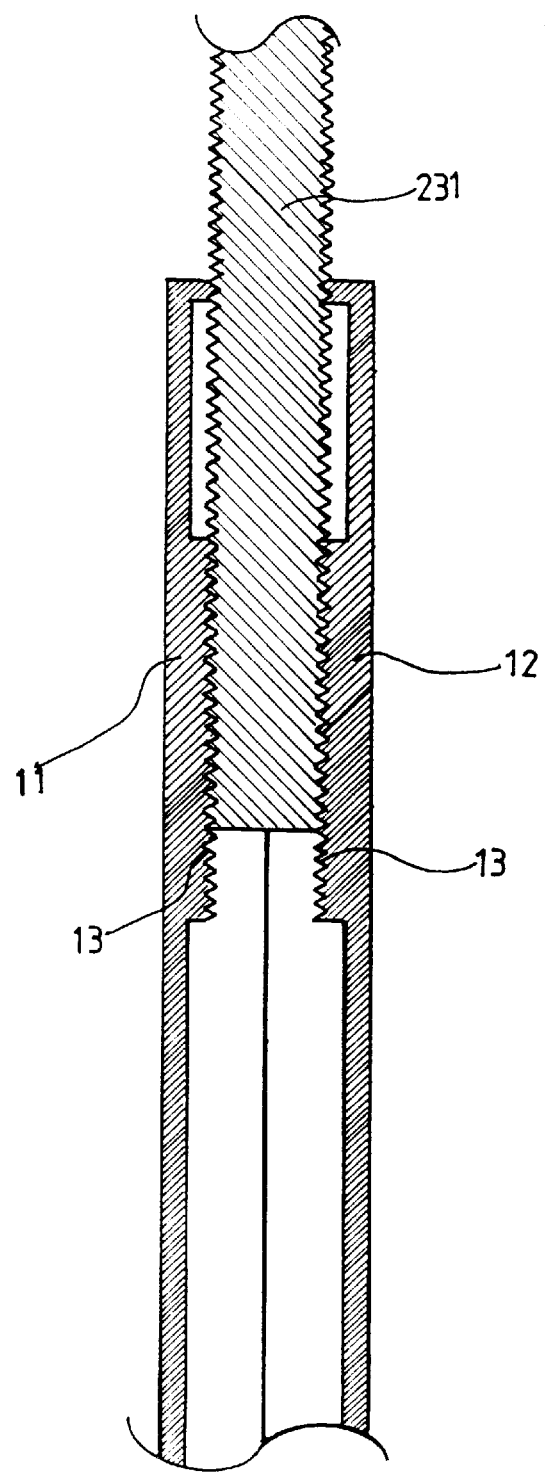
FIG. 3 is an enlarged fragmentary sectional view of the present invention.

With reference to the drawings and in particular to FIGS. 1, 2 and 3 thereof, the monitor filter according to the present invention generally comprises a frame 1 and a pair of adjusting arms 2.

The frame 1 is composed of an outer cover 11, an inner cover 12 and an anti-radiation screen 3. The outer cover 11 has the same structure as the inner cover 12. Each of the outer and inner covers 11 and 12 has two upper corners each having a semi-cylindrical recess 14 which is formed with internal screw threads 13, so that the rectangular frame will have two threaded holes at two upper corners thereof when the outer and inner covers 11 and 12 are joined together.

The adjusting arm 2 has a body portion 21 having a bottom provided with a slip-proof material 22 and a downwardly extending screw 23 having threads 231 threadedly engageable with each of the threaded holes of the frame 1 (see FIG. 3).

Figure 4:
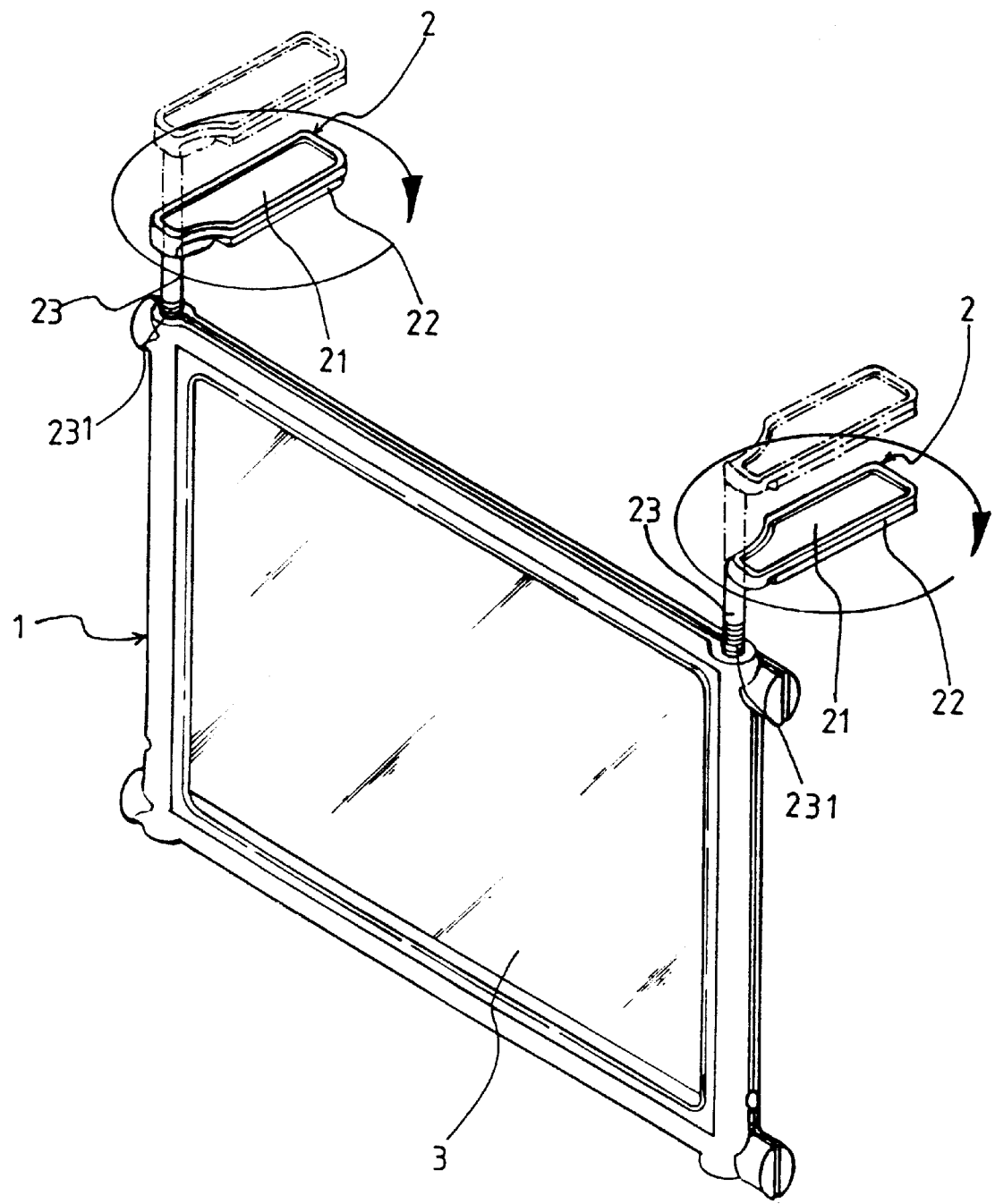
FIG. 4 is a working view of the present invention.

Referring to FIGS. 2 and 4, when in use, the adjusting arms 2 are first rotated to position the anti-radiation screen 3 right in front of the monitor (shown but not numbered) and then mounted on the top of the monitor. As the bottom of the adjusting arms 2 is provided with a slip-proof material 22, the adjusting arms 2 will be firmly positioned on the top of the monitor.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A monitor filter comprising:

a rectangular frame including a first cover and a second cover engaged with said first cover, said first and second covers being of identical structure, each of said first and second covers having two upper corners formed with a semi-cylindrical recess having screw threads such that said rectangular frame will have two threaded holes at two upper corners thereof when said first and second covers are joined together; and a pair of arms each having a bottom provided with a slip-proof material and a downwardly extending screw threadedly engageable with each of said threaded holes.

* * * * *